United States Patent
Bechhoefer (10) Patent No.: US 7,684,936 B2
(45) Date of Patent: Mar. 23, 2010

(54) METHOD, APPARATUS AND COMPUTER PROGRAM PRODUCT FOR DETERMINING A FUTURE TIME OF A COMPONENT

(75) Inventor: Eric Robert Bechhoefer, New Haven, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 0 days.

(21) Appl. No.: 12/116,567

(22) Filed: May 7, 2008

(65) Prior Publication Data
US 2009/0281735 A1 Nov. 12, 2009

(51) Int. Cl.
*G01B 3/52* (2006.01)
*G06F 19/00* (2006.01)

(52) U.S. Cl. ............... 702/34; 701/29; 702/181; 702/183

(58) Field of Classification Search ............ 702/34, 702/108, 181, 182, 183, 185, 193, 197; 701/29; 703/7
See application file for complete search history.

(56) References Cited

U.S. PATENT DOCUMENTS

| | | |
|---|---|---|
| 6,651,012 B1 | 11/2003 | Bechhoefer |
| 6,711,523 B2 | 3/2004 | Bechhoefer et al. |
| 6,728,658 B1 | 4/2004 | Bechhoefer |
| 6,754,569 B2 | 6/2004 | Bechhoefer |
| 6,847,917 B2 | 1/2005 | Bechhoefer |
| 7,020,569 B2 * | 3/2006 | Cao et al. ............... 702/108 |
| 7,136,794 B1 | 11/2006 | Bechhoefer |

OTHER PUBLICATIONS

Eric Bechhoefer, etal., "*A Generalized Process for Optimal Threshold Setting in HUMS*;" AHS Forum 60, May 2004.
In re Eric Bechhoefer, U.S. Appl. No. 11/301,284, filed Dec. 12, 2005, entitled "*Setting Thresholds Based on a Health Indicator Function*".
James J. Zakrajsek, et al., "*Rotorcraft Health Management Issues and Challenges*,", NASA/TM—2006-214022, Feb. 2006.
Eric Bechhoefer, et al., "*Mechanical Diagnostic System Engineering in IMD-HUMS*," IEEE Aerospace Conference, Mar. 2006.
Eric Bechhoefer, et al., "*Use of Non-Gaussian Distribution for Analysis of Shaft Components*," IEEE Aerospace Conference, Mar. 2006.
Eric Bechhoefer, et al., "*Use of Paris Law for Prediction of Component Remaining Life*," IEEE Aerospace Conference, Mar. 2008.

* cited by examiner

*Primary Examiner*—John H Le
(74) *Attorney, Agent, or Firm*—Muirhead and Saturnelli, LLC (57) ABSTRACT

A method, apparatus and computer program product are provided for determining a future time associated with a component, where the future time can be indicative that some action can be taken with respect to the component. In some embodiments, the future time can be indicative of a component's remaining useful life or time until maintenance is required. The future time can be determined as a function of a health indicator and a material constant. In some embodiments, the functional relationship between the future time, the health indicator and the material constant can be based on the functional relationship of Paris' law for fatigue crack growth.

21 Claims, 3 Drawing Sheets

METHOD, APPARATUS AND COMPUTER PROGRAM PRODUCT FOR DETERMINING A FUTURE TIME OF A COMPONENT

FIELD OF THE INVENTION

Embodiments of the present invention relate generally to component health analysis, and, more particularly, relate to a method, apparatus and computer program product for determining a component's future time through statistical analysis.

BACKGROUND OF THE INVENTION

The failure of components on an aircraft, and in particular moving components on a helicopter such as rotor transmission gears, can result in catastrophic consequences. As such, aircraft are often kept on strict maintenance and component replacement schedules based on the hours of operation. These static, predetermined maintenance and replacement schedules are developed considering worst case component failure rates based on statistical data compilations and load cell testing. However, in some instances these replacement schedules may indicate replacement time intervals that are too aggressive, which can result in needless replacement of healthy components. Since aircraft components are often quite expensive, the cost associated with needless replacement of healthy components can be relatively high. Additionally, there is an operation cost of removing aircraft from service when in fact no maintenance is required. Further, in some instances replacement schedules may indicate a replacement time interval that is too relaxed, such as when faulty or defective materials are installed, which can result in unexpected component failure and unscheduled maintenance. Unscheduled maintenance results in lost revenue and decreased operational readiness, both which are important to aircraft operators.

As a result of these issues with the accuracy of component replacement schedules, Health and Usage Monitoring Systems (HUMS) have been developed. A HUMS can process vibration data associated with a component to generate condition indicators (CI). These condition indicators are descriptive statistics of a component. Transmission of power to rotors and other moving components of an aircraft induce vibrations in the structures supporting the moving components. The vibrations can occur at frequencies that correspond to a shaft rotation rate, mesh rate, bearing passing frequency or the like, as well as their harmonics. Changes in these frequencies can be indicative of the health of the components. As such, the vibration frequencies can be sensed by vibration sensors, and associated data can be gathered by a HUMS. The HUMS can then analyze the vibration data and determine the health of the components by evaluating the condition indicators.

Utilization of the vibration data to predict component failures is difficult. As such, improved mechanisms for analyzing vibration data to determine the health of components would be desirable. In particular, it would be desirable to develop an improved mechanism for determining a time when actions can be taken with respect to a component. As described above, such a solution can result in increased safety and cost savings.

BRIEF SUMMARY OF THE INVENTION

Methods, apparatuses and computer program products are therefore provided in accordance with exemplary embodiments of the present invention for determining a future time of a component which may be indicative of the time until maintenance is required on the component. The future time of a component can be determined as a function of a health indicator and a material constant, where the future time may be converted from a number of fatigue cycles.

According to various exemplary embodiments, a future time of a component can be determined by determining a health indicator at a given time and a rate of change of the health indicator over a period of time. In various exemplary embodiments, the health indicator and the rate of change of the health indicator can be determined by conditioning the health indicator over a period of time. In this regard, according to various exemplary embodiments, the health indicator can be conditioned using a Kalman filtering process. According to various other exemplary embodiments, the health indicator can be conditioned utilizing Markov modeling. In some exemplary embodiments, a material constant can also be generated by filtering estimations of the material constant which can be developed using the rate of change of the health indicator. In some exemplary embodiments, an extended Kalman filtering process can be used to generate the material constant.

In various exemplary embodiments, a number of fatigue cycles can be determined as a function of the health indicator and the material constant and functional relationship associated with Paris' law can be utilized where the health indicator at a given time is utilized as a surrogate for a crack length. The number of fatigue cycles can be converted into the future time by using a conversion factor. According to various exemplary embodiments, upon determining the future time, the future time can be compared against a threshold value. If the future time is less than the threshold, a notification can be generated.

BRIEF DESCRIPTION OF THE SEVERAL VIEWS OF THE DRAWING(S)

Having thus described exemplary embodiments of the present invention in general terms, reference will now be made to the accompanying drawings, which are not necessarily drawn to scale, and wherein:

DETAILED DESCRIPTION OF THE INVENTION

Exemplary embodiments of the present invention will now be described more fully hereinafter with reference to the accompanying drawings, in which some, but not all embodiments of the present invention are shown. Indeed, the present invention may be embodied in many different forms and should not be construed as limited to the exemplary embodiments set forth herein; rather, these exemplary embodiments are provided so that this disclosure will satisfy applicable legal requirements. Like reference numerals refer to like elements throughout.

The methods, apparatuses and computer program products of exemplary embodiments of the present invention utilize health indicators to determine a future time which can be indicative of a time when some action can be taken with respect to a component. In some instances the future time can be described as a remaining useful life (RUL), or time until maintenance is required, for a particular component. As such, a functional relationship can be determined between health indicator data and the future time, which can be used to predict when a component may need maintenance. In this regard, a component can be a component of a system such as a vehicle, a motorcraft, a hovercraft, an aircraft or the like. Further, a component can be portion of a system, such as a sub-system which can include a transmission, a motor, a suspension apparatus or the like, or a component can be an element of a sub-system, such as a drive shaft, a gear, a bearing, structural component or the like.

The basis of the functional relationship between health indicator data associated with a component and future time can be derived in various ways. In one exemplary embodiment of the present invention, the functional relationship associated with Paris' law for fatigue crack growth can be used as a basis for determining a functional relationship between health indicator data and future time.

Paris' law has traditionally been used to determine a rate of crack growth as a component is subjected to repetitive fatigue conditions. In other words, as a material, such as a metal coupon, is subjected to repetitive or cyclic fatigues, or forces, such as a repetitive or cyclic bending force, a crack can develop in the material. Paris' law can be used to predict the growth rate of the generated crack in the material. As such, Paris' law can also be used to determine the length of the generated crack, i.e., the crack length, after a particular number of cycles of the bending force have occurred. For example, consider a coupon of metal where the size and shape of the sheet, as well as one or more characteristics of the composition of the metal, are known. This exemplary metal coupon can be subjected to a repetitive or cyclic bending where characteristics of the bending are also known. Given these conditions, Paris' law can be used to predict the growth of a crack, such as the change in the length of a crack that may develop in the metal, as a result of each bending cycle.

The determination of the change in crack length given a number of bending cycles, more generally known as fatigue cycles, can also provide information that can assist in determining when a failure of a material will occur, since a relationship can exist between crack length and failure. Further, when Paris' law is applied to a synchronous system, i.e., where the fatigue cycles occur at regular intervals of time, the change in crack length can be determined at a particular time, and a future time can be established. As such, where the characteristics of the material and the fatigue being placed on the material are known, Paris' law can be used to predict the crack length in the material at a given number of fatigue cycles or at a given time in synchronous systems.

Paris' law can be described mathematically as $$da/dN = D(\Delta K)^m$$

where $\alpha$ is the half crack length, N is the number of fatigue cycles, $da/dN$ is the rate of change of the half crack length with respect to the number of fatigue cycles, D is a material constant of the crack growth equation and a crack geometry, and m is an exponent that may be selected based on the material type to be analyzed. Also in the above law, $\Delta K$ is the range of a stress intensity factor K, where K may be based on a loading state. In this regard, $\Delta K$ can be described mathematically as $\Delta K = 2\sigma\alpha(\pi\alpha)^{1/2}$, where $\sigma$ is the gross strain and $\alpha$ is a geometric correction factor.

While effective application of Paris' law is possible in closely-controlled laboratory-type settings, application of Paris' law to real world conditions can be problematic because many of the material characteristics and the fatigue characteristics may not be accurately known. As such, in order to make use of the functional relationship present in Paris' law in real world applications, substitutions and manipulations of the variables involved can be utilized. In this exemplary embodiment of the present invention, various means can be used to determine the variables or the substitutions for the variables to implement a functional relationship between future time and health indicators, where the functional relationship is determined by utilizing Paris' law as a basis.

According to various exemplary embodiments, assumptions and manipulations can be applied to Paris' law to determine a future time. For example, the Paris' law exponent m can be set to various values depending on the exemplary embodiment that may be utilized. However, in situations where the stress or force on a component is substantially constant throughout the failure of the component, the Paris' law exponent may be set to two. Exemplary components where the stress or force on the component may be constant throughout the failure of the component may include wing spars, wing panels, gears, shafts, some shaft couplings, and the like. Further, in situations where the stress or force on a component decreases throughout the failure of the component (e.g., in situations where the component is no longer supporting some or all the stress or load), the Paris' law exponent may be set to one-half. Exemplary components where the stress or force on the component may decrease throughout the failure of the component may include bearings, spline shaft couplings, and the like. Regardless of the selected value, in some embodiments, the exponent can be tested such that the best model fit is chosen.

Further, for example, the geometric correction factor $\alpha$ can be set to one. After performing these substitutions, where the exponent of the crack growth equation is set to two and the geometric correction factor is set to one, Paris' law can reduce to:

$$d\alpha/dN = D(4\sigma^2 \pi\alpha)$$

Since, as discussed, in synchronous systems the number of cycles can be used to determine a time to a particular crack length, the equation can be solved for the number of fatigue cycles N resulting in:

$$N = (1/(D(4\sigma^2 \pi)))(\ln(\alpha_f) - \ln(\alpha_o))$$

where $\alpha_f$ is the future crack length and $\alpha_o$ is the current, measured crack length. In this form, and considering a synchronous system, the time until a desired crack length occurs can be calculated and, by association, a future time can be determined. However, since crack length cannot easily be measured, and a desired crack length may not be known with respect to a future time, an additional substitution with respect to crack length can be utilized.

According to various exemplary embodiments, a health indicator can be substituted for crack length in Paris' law. Several studies have shown that a relationship can exist between component failure and health indicators where the health indicators are based upon, for example, vibration data and damage to components. As such, component health can be used as a surrogate for crack length in Paris' law, and future time can be determined as a function of the health indicator of a component. To condition the health indicator for this use, the health indicator can be normalized to within a range of values including a threshold value. The threshold value can be a value selected within the range of values, such that when the threshold value is reached or exceeded action can be taken with respect to the related component, such as, for example, maintenance can be performed. For example, a threshold value of 0.9 can be selected where the health indicator ranges from 0.0 to 1.0. Exceeding the threshold value can indicate that a high probability exists that the component may be damaged. Using such a conditional health indicator in conjunction with Paris' law can result in a determination of future time with respect to a particular component based on a prediction of when the health indicator will reach the threshold value. Note that the use of such conditioning to indicate a need for maintenance is merely exemplary and other conditioning definitions or policies may be utilized.

Figure 1:
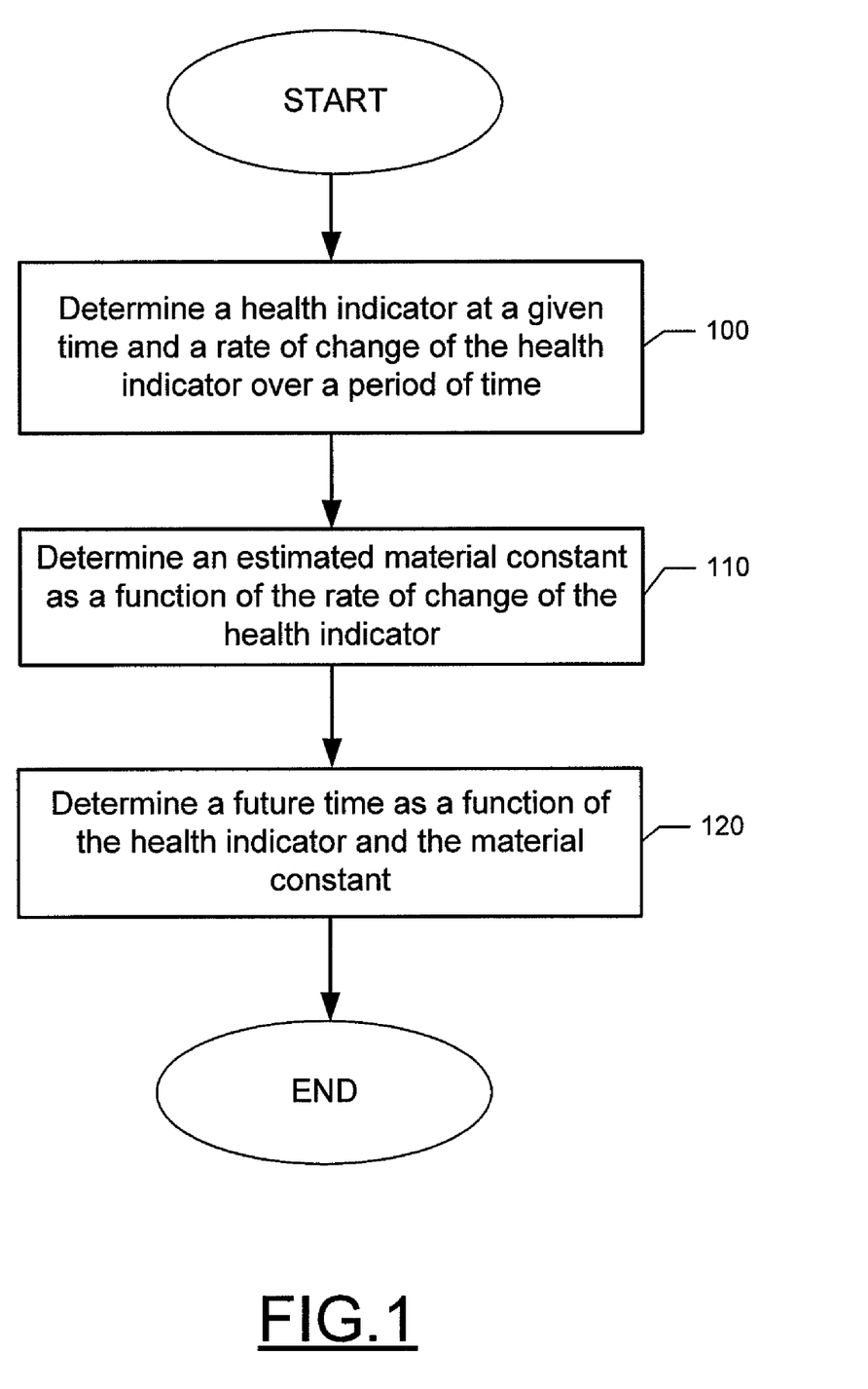
FIG. 1 is a flow chart including various steps of a method of determine a future time of a component according to various exemplary embodiments of the present invention.

Based on the foregoing concepts, FIG. 1 depicts one aspect of the invention including various steps in a method of determining a future time with respect to a component. As shown at 100, the method may include generating a health indicator and a rate of change of the health indicator. In various exemplary embodiments, the health indicator and its rate of change may be selected or otherwise determined from health indicator data, which may be based on information gathered from non-destructive inspections of components.

In some exemplary embodiments, health indicator data can be derived from vibration data gathered from vibration sensors on or proximate the component or system (e.g. aircraft). For example, systems such as HUMS can gather data from the vibration sensors and store the vibration data for analysis. The vibration data can be analyzed to locate changes in the vibration frequencies and other characteristics such as, for example, condition indicators, which can indicate the health of a component of the system. In this regard, health indicators can be determined from the data with respect to a component of interest. Further, a health indicator can be determined via various algorithms that have been developed for detecting anomalous states of components. As such, the algorithms used to determine health indicators can differ with respect to differing components. Further, algorithms for determining health indicators can be based on the a priori of information associated with vibration data. In this regard, the algorithms used to determine health indicators can be dynamic with respect to vibration data captured for a particular type of component. As additional vibration data, and accordingly condition indicators, are gathered with respect to a particular component, the algorithm used to calculate a health indicator may change in accordance with the newly gathered data.

In general, a health indicator can be a function of condition indicators. Condition indicators can be chosen such that they are sensitive to one or more failure modes of a component. For example, on a monitored shaft, shaft order one, two and three would be the condition indicators. Shaft order one can be sensitive to an out of balance condition, while shaft order two can be sensitive to a bent shaft condition, and shaft order two and three can be sensitive to a loose or cracked shaft coupling. As such, the condition indicators can be statistics, and as such, have some given probability distribution. A health indicator can therefore be a function of these distributions. As such, advanced statistical techniques can be used to calculate the distribution of the health indicator. Once the distribution of the health indicator is known, performance criteria for component anomaly detection can be derived. For example, if the probability of false alarm (a performance criteria) is set to $10^{-6}$ such that the health indicator for a nominal component would be larger than 0.5, then a health indicator of 1 can represent a component which is grossly anomalous, and by definition it may be appropriate to perform maintenance on the component. It may be appropriate to perform maintenance if the component is damaged and in need of repairs, yet not so damaged as to put, for example, an aircraft or crew at appreciably greater risk. That is, if maintenance is delayed such that the risk of component failure is high, then maintenance may be too late.

One example of an algorithm used to calculate health indicators can be based on a statistical approach of multi-dimensional hypothesis testing using a Nakagami probability distribution. The Nakagami distribution can be similar to the Rayleigh, Rice and Chi-Square distributions. The Chi-Square distribution $R^2$ of $\eta$ degrees of freedom can be a transformation of a Gaussian distributed random variable X where $$R^2 = \Sigma_{i=1}^n X_i^2$$

In this regard, if the distribution of X is zero mean, $R^2$ can be a central Chi-Square. The Rayleigh distribution can be the square root of the central Chi-Square distribution for n=2 degrees of freedom.

In a case where X is not zero mean, a non-central Chi-Square distribution can result and the square root of the distribution can be a Rice distribution. This can be the distribution associated with damaged shafts or bearings, e.g., centrality of SO1, SO2 and SO3 greater than zero where SO1 represents the vibration associated with the rotational frequency, SO2 represents two times the rotational frequency, and SO3 represents three times the rotational frequency.

A Nakagami distribution can be a generalized case of the square root of the central Chi-Square distribution. The Nakagami distribution can be used to characterize the statistics of signals transmitted through multipath fading channels. The function can measure a normalized distance R:

$$R = \sqrt{\Sigma_{i=1}^n X_i^2}$$

The probability density function (PDF) for this distribution can be given as $$f(R) = 2/\Gamma(\mu)(\mu/\Omega)^{\mu} R^{2\mu-1} e^{-\mu R^2/\Omega};$$

where $\Gamma$ can be the Gamma Function, $\Omega$ can be defined as $$\Omega = E[R^2]$$

where E can be the expected value and $\mu$ can be defined as the ratio of moments.

$$\mu = \Omega^2/E[(R^2-\Omega)^2], \mu \geq \tfrac{1}{2}$$

By setting $\mu=1$, a Rayleigh PDF can be developed. In this regard, $\Omega$ can be used as in the development of health indicators, since $\Omega$ can be the expected value of $R^2$, where $R^2$ is a Chi-Square distribution of $\eta$ degrees of freedom.

Based on the forgoing, a health indicator can be derived from condition indicators, which in turn may be derived from vibration data. For a shaft and bearing condition indicator, the general form of one exemplary health indicator calculation can be:

$$HI = \sqrt{CI^T \Sigma^{-1} CI} * 0.5/v$$

where HI is the health indicator, CI is a vector of condition indicator values ($CI^T$ is the transpose of the vector CI), $\Sigma$ is the covariance of the condition indicator values, and $v$ is the critical value for a Nakagami distribution with $\eta$ degrees of freedom. In this exemplary manner of determining health indicators, $\eta$ can be set to 3, a probability of false alarm can be set to $10^{-6}$, and $v$ can be set to 9.44.

As described above, condition indicators based on magnitudes, such as SO1, SO2 and SO3, can have a Rayleigh distribution for a nominal component (e.g., a component that is not experiencing, for example, imbalance, misalignment, looseness, or a bent shaft). Similarly, it can be shown that condition indicators for bearings, such as envelop bearing rates, can also have a Rayleigh distribution. Given this information, a process for establishing a detection algorithm can be presented.

In sampling theory, a representative population can be sampled and statistics can be gathered that describe some underlying phenomena. In the case of a nominal shaft or bearing which are undergoing forced vibration, a statistic that can be estimated is $\beta$, which is the underlying standard deviation of the Rayleigh distribution. Ideally, one would have available some large number of shafts from which SO1, SO2, and SO3 can be calculated. From this, the sample SO1, SO2, and SO3 standard deviation can be calculated and $\beta$ can be estimated by:

$$\beta = \sigma/\sqrt{2-\pi/2}$$

With the estimated $\beta$, one can use the Rayleigh cumulative distribution function (CDF) and set a threshold for any probability of false alarm (PFA). During acquisitions of vibration data, the measured condition indicator can be compared against the threshold and a recommendation can be made. Again, from a system perspective, this may not be ideal because opportunities to generate a false alarm can occur.

Alternatively, the condition indicators can be summed together, in which case a distance can be compared to a threshold. In order to weight each condition indicator equally, the condition indicators can be normalized by their standard deviations (e.g., information matrix). For instance, where CI is a vector of condition indicators representing the measured SO1, SO2, and SO3, and $\Sigma$ is the sample covariance from a set of nominal shafts:

$$R^2 = CI^T \Sigma^{-1} CI$$

Further, if the condition indicators are zero mean Gaussian, the expected value of $R^2$ can be the number of degrees of freedom. By normalizing by the covariance:

$$R^2 = \Sigma_{i=1}^n CI_i^2 / (2-\pi/2)\beta_i^2$$

By substitution this can be expanded to:

$$R^2 = 1/(2-\pi/2) \sum_{i=1}^n \sqrt{X_{1i}^2 + X_{2i}^2}^2$$

$$= 1/(2-\pi/2) \sum_{i=1}^{2n} X_i^2 \quad X \in N(0,1)$$

where X is a Normal Gaussian zero mean with standard deviation of one. A well known statistical property is:

$$E[\alpha \times f(r)] = \alpha \times E[f(r)]$$

Further, the expected value of the normalized sum of $\eta$ Rayleigh distribution can be $1/(2-\pi/2)*2*n$. This result can give an absolute measure of normality for any magnitude base health indicator. With this, $\Omega$ can be found to be $1/(2-\pi/2)*2*\eta$ and $\mu$ can be found to be $\eta$. These parameters, coupled with the inverse Nakagami CDF can give the threshold value for any PFA. This also allows calculation of the HI mean value and variance. In particular, for a PFA of $10^{-6}$, and $\eta=3$, the critical value for the inverse Nakagami is $v=9.44$.

Thus, by dividing $\sqrt{CI^T \Sigma^{-1} CI}$ by $v$, and multiplying by 0.5, the health indicator can be scaled such that the probability of exceeding 0.5 is $10^{-6}$. Note that this can further allow a calculation of a health indicator's expected value and variance. Namely for a given $\Omega$ and a given $\mu$, the Nakagami expected value and variance can be given. The health indicator mean value and variance can then be calculated. In this example, the expected HI, i.e., health indicator, is 0.178, and variance is 0.0028.

As a result of this process, health indicator data can be generated over a period of time. In the same regard, the differences in health indicator data can be considered over the period of time to determine a rate of change of the health indicator. For more information on the generation and distribution of measured health indicators, see U.S. patent application Ser. No. 11/301,284, entitled Setting Thresholds Based on a Health Indicator Function, filed Dec. 12, 2005, which is hereby incorporated by reference.

In some circumstances, health indicators may be determined based upon vibration data that is noisy and, as such, conditioning the health indicators can improve results. According to various exemplary embodiments, a Kalman filter can be utilized to condition, or filter, the health indicator data. The Kalman filter can additionally be used to filter and state reconstruct an unknown parameter, such as the rate of change in a health indicator over a period of time or the health indicator itself at a given time. In this regard, the Kalman filter can be a kinematic model in which a filter gain can be set based on a measurement and system variance. A batch process for a system can be represented as follows:

$$X_{t|t-1} = FX_{t-1|t-1} \quad \text{—State Propagation}$$

$$P_{t|t-1} = FP_{t-1|t-1}F' + Q \quad \text{—Predicted Covariance}$$

$$K = P_{t-1|t-1}H'[HP_{t|t-1}H' + R]^{-1} \quad \text{—Kalman Gain}$$

$$P_{t|t} = (I - KH)P_{t|t-1} \quad \text{—State Covariance}$$

$$X_{t|t} = X_{t|t-1} + K(Y - HX_{t|t-1}) \quad \text{—State Update}$$

where t|t−1 is the condition statement (i.e., t given the information at t−1), X is the state information (x, x dot, x double dot), P is the state covariance matrix, Q is the process noise model, H is the measurement matrix, R is the measurement variance, and F is the state transition matrix. According to this exemplary embodiment, the states can be health, and the rate of change of health (dHI/dt), and F can be an integrator. As such, the Kalman filter as described above can be used to filter the measured health indicator and the calculated dHI/dt (rate of change of the health indicator). However, calculations of the filtering operation can at times result in increases in the health indicator over time which would indicate that a component has healed. Since this is typically not possible, a logical operation can be included in the filtering process to change any negative health indications to zero or small positive values. This can be done with respect to both dHI/dt and the health indicator. Further, in various exemplary embodiments, Kalman filter factors for plant noise and measurement noise can also be input. In one embodiment, plant noise can be set to 0.01, i.e., the maximum rate of change of health is 0.01 per hour, and the measurement noise can be set to 0.055, i.e., a standard deviation of the health indicator with respect to a particular component. Upon completion of the Kalman filtering process, the health indicator at a given time and the rate of change of the health indicator over a period of time can be refined and useable in a functional relationship based on Paris' law.

According to various other exemplary embodiments, a Markov modeling scheme can be utilized in lieu of a Kalman filter to condition the health indicator. A Markov modeling scheme can avoid the situation where negative health indicators are generated. In this regard, a Markov model can be built where the health indicator is a hidden value. Further, the health indicators can be related to the hidden health indicator by a stochastic function. A Markov model technique can then be used to map a resultant health indicator from the hidden health indicator by using a priori knowledge. In this manner a health indicator can be generated at a given time and a rate of change of the health indicator can be generated over a period of time.

In the use of Markov models, a system can be simplified into a stochastic process with a finite number of state values. The set of possible values of the process can be a set of non-negative integers such as $\{0, 1, 2, \ldots\}$. These state values can be mapped to various component conditions such as, for example, new, good, worn, warning, and alarm. In this regard, where $X_n = i$, the process is in state i at time n. In the form of an equation the system can be described as:

$$P\{X_{n+1}=j | X_n=i, X_{n-1}=i_{n-1}, \ldots X_0=i_0\} = P_{ij}$$

for all states $i_0, i_1, \ldots i_{n-1}, i, j$ and all $\eta > 0$. The result can be a Markov chain. The equation states that the conditional distribution of a future state $X_{n+1}$ given the past states $X_0, X_1, \ldots X_{n-1}$ and the present state $X_n$ is only dependent on the present state. As such, the probability $P_{ij}$ can represent the probability that the process will, when in state i, make the next transition into state j. Since the probability is non-negative and the process must make a transition into a new state, even if the transition is to the same state, it can be that:

$$\Sigma_{j=0}^{\infty} P_{i,j} = 1, i=0, 1, \ldots$$

In situations where the number of states needed to represent a process is large, the number of required parameters for representing the transition probability can be of the order $\eta^{k+1}$. As a result, the number of states can be restricted to the value of k, which in some instances may not be a sufficient number of states to satisfy the Markov assumption. To address this, it can be presumed that past data in the sequence can be summarized by a state variable at time t. As such, this Hidden Markov Model may not assume that the observed data sequence has a Markov property. However, another unobserved, hidden but related variable, the state variable, can be assumed to exist and have the Markov property.

For example, with respect to a health indicator system, the true state of the component may not be observed or measured. Rather, the health indicator can be measured with some associated probability function. The relationship between the measured health indicator (HI) can be $HI_{t1} = \{HI_1 \ldots HI_t\}$ and the hidden state sequence $H_{t1}$ can be given by the following conditional independence assumptions:

$$P(HI_t | H_1^t, HI_1^t) = P(HI_t | H_t)$$

and $$P(H_{t+1} | H_1^t, HI_1^t) = P(H_{t+1} | H_t)$$

As such, the predicted state at $H_{t+1}$ and the measured data $HI_t$ can be completely conditioned by the state variable $H_t$. These conditional independence assumptions can assume independence so that a joint distribution of the hidden HI and the measured H variables can be simplified to:

$$P(HI_1^t, H_1^t) = P(H_1) \Pi_{t=1}^{T-1} P(H_{t+1} | H_t) \Pi_{t=1}^{T} P(HI_t | H_t)$$

This joint probability function can then be specified by the initial state probabilities $P(H_1)$, the transition probabilities $P(H_t | H_{t-1})$, and the emission probabilities $P(HI_t | H_t)$.

As an example of the use of Markov modeling, consider a drive train component that is initially new. As the drive train wears, it can be characterized as progressing through k=6 distinct states: new, good, worn, warning, alarm, and prior to failure. The time spent in each state can be a random variable with some mean and variance. The probability of transitioning into a state is $P_{ij}$. As such, the process can be appropriately modeled by a Hidden Semi-Markov Model process. The Hidden Semi-Markov Model can be similar to the Hidden Markov Model, except that each state can emit a sequence of observations.

The Hidden Semi-Markov Model can have four basic problems to solve in order to be used as a prognostic tool. The first problem to compute can be the emission probabilities $P(HI_t | H_t)$, given a sequence of observations of HI. Second, given a sequence of observations of HI, the transition probabilities $P(H_t | H_{t-1})$ can be computed. Third, given a sequence of observations of HI, the initial state probabilities $P(H_1)$ can be computed. And finally, fourth, given a sequence of observations of HI and the transition probabilities $P(H_t | H_{t-1})$, the duration distribution for a given state can be computed. Dynamic programming techniques have been developed to solve problems such as these. The health indicator, i.e., HI, developed from the Hidden Semi-Markov Model process can be denoised and can allow for a priori knowledge, such that the component may not generate results that indicate the component is healing. This can enforce the condition that dHI/dt may be greater than or equal to zero. As such, the application of Paris' law can allow a better calculation of dHI/dt (e.g., as a result of less noise in the health indicator).

Having generated a health indicator at a given time and a rate of change of the health indicator over a period of time, a material constant can be generated at 110. The material constant can be generated as a function of the rate of change of the health indicator. Further, in some exemplary embodiments, a material constant can be generated by filtering estimates of the unknown material constant parameter. Further, the material constant can be generated via filtering using an extended Kalman filter. While in some exemplary embodiments, the variable D has been referred to as the material constant with respect to Paris' law, the material constant can be redefined to also include other unknowns, such as gross strain, when applying the extended Kalman filter. In this regard, it can be noted that gross strain can hold a relationship with torque and if torque values are known, then the gross strain can be replaced by the torque times some unknown constant. Further, it can hypothesized that any change in component health can be a function of torque since it can be apparent that high torque can result in more damage to a component than low torque. As such, a relationship between torque and health can also be considered. Thus, the $D(4\sigma^2 \pi)$ portion of Paris' law can be generated using the extended Kalman filter. An estimate of the health indicator, substituted for crack length $\alpha$ in Paris' law, and strain $\sigma$ can be derived from a current estimate of the material constant. The state prediction of strain $\sigma$ and $\alpha$ are:

$$\hat{\alpha} = da/dN \big/ \hat{D}(4\sigma^2 \pi a) \text{ and}$$

$$\hat{\sigma} = \sqrt{da/dN \big/ \hat{D}(4\pi a)}$$

where $\hat{D}$ can be the state estimator for D. Further, the measurement matrix H, which is now the Jacobian of the equations for $\hat{\alpha}$ and $\hat{\sigma}$ above, can be described as:

$$H = \begin{bmatrix} -da/dN/4D^2\pi a \sqrt{da/dN/\hat{D}(4\pi a)} & 0 \\ -da/dN/4D^2\pi\sigma^2 & 0 \end{bmatrix}.$$

In this regard, in utilizing the above equations in the extended Kalman filter, the rate of change of the health indicator generated at 100 can be substituted for $d\alpha/dN$, and the health indicator from 100 can be substituted for $\alpha$. Using the state predictions and the measurement matrix as described above, an extended Kalman filter can be utilized to generate a value for the material constant D. Again, in filtering the material constant, at times in the calculations, negative values can result which are nonsensical. As such, a logical operation can be included where the negative values are changed to zero or small positive values.

According to various exemplary embodiments of the present invention, a future time can be determined as a function of the health indicator and the material constant at 120. In this regard, the future time can be measured in any units to sequence events including not only seconds, minutes, hours, days, or the like, but also other measurements of time such as fatigue cycles. In some exemplary embodiments, the determined future time can be indicative of a desirable time for performing maintenance on a related component. The functional relationship between the future time, the health indicator and the material constant can be determined by utilizing a functional relationship associated with Paris' law. In this regard, Paris' law can be manipulated, i.e., $N=(1/(D(4\sigma^2\pi))(\ln(\alpha_f)-\ln(\alpha_o))$, and the resultant relationship can be utilized. In this regard, the health indicator can be substituted in for the current crack length $\alpha_o$ and the filtered material constant value can be substituted in for $D(4\sigma^2\pi)$. Further, based upon a threshold value according to a definition or policy described above, where a health indicator equal to 0.9 indicates that some action can be taken with respect to the component such as maintenance, and the health indicator ranges from 0.0 to 1.0, 0.9 can be input into the equation for $\alpha_f$.

With these values input for the variables of a functional relationship based on Paris' law, the future time can be determined for a component. The future time can be determined by first calculating a value for N, i.e. the number of fatigue cycles, by solving the functional relationship based on Paris' law. The value determined for N can then be converted into the future time. In exemplary embodiments where the system is a synchronous system, such as a helicopter, the number of cycles per unit of time can be constant. Therefore, using the number of cycles per unit of time as a conversion factor, the future time can be determined. For example, in helicopter systems, the rotation of the rotor with respect to time can be used as a conversion factor since rotor speed is constant.

According to various exemplary embodiments, once the future time is determined at 120, a notification can be generated if the future time is less than a predetermined threshold. For example, maintenance with respect to some components may require the replacement of parts. The parts may have a lead time for delivery and acquisition. In this regard, a threshold time value can be determined when particular parts may need to be ordered for the parts to be available when the machine reaches the actual maintenance time. In some embodiments, the threshold time value may be a dynamic value that may change based on predicted cost, predicted labor availability, predicted utilization of a component, and the like. In this regard, changes in these and other factors may result in changes to the threshold time value.

For example, consider a helicopter that is used on average five flight hours per business day. The helicopter will soon need maintenance on a transmission and that includes parts such as gears which will need to be replaced at the next maintenance. Say the gears take ten business days to arrive once they are ordered. As such, it can be determined that the gears should be ordered when the helicopter is 50 flight hours from a maintenance event. As such according to various exemplary embodiments, a threshold can be set for 50 hours so that a notification is provided that indicates that the gears of the transmission should be ordered. Use of a threshold in this manner can reduce the down time of a machine for maintenance. While this is one example of a use of a notification, various other uses for notifications and associated threshold values can be implemented. Further, the notification itself can be communicated in various fashions including but not limited to email, text messaging, flags within a maintenance system, and the like.

In another example, consider the scheduling of a maintenance crew in association with the operation of an aircraft. In some situations it may be most cost effective to perform necessary maintenance on a weekday (i.e., Monday through Friday) rather than on the weekend. If the aircraft will soon need maintenance, it can be determined that, based on a regular flight schedule or other prediction of aircraft utilization, a maintenance event of a component may arise on a weekend. Since the cost of weekend maintenance is costly (e.g., due to payment for overtime wages) the threshold time value may be altered based on the cost, and the maintenance may be scheduled prior to the weekend, on a weekday. As such according to various exemplary embodiments, the threshold time value can be set so that a notification is provided that indicates that the maintenance should be performed on, for example, the Friday before the weekend. Use of a threshold in this manner can reduce the cost of maintenance.

Figure 2:
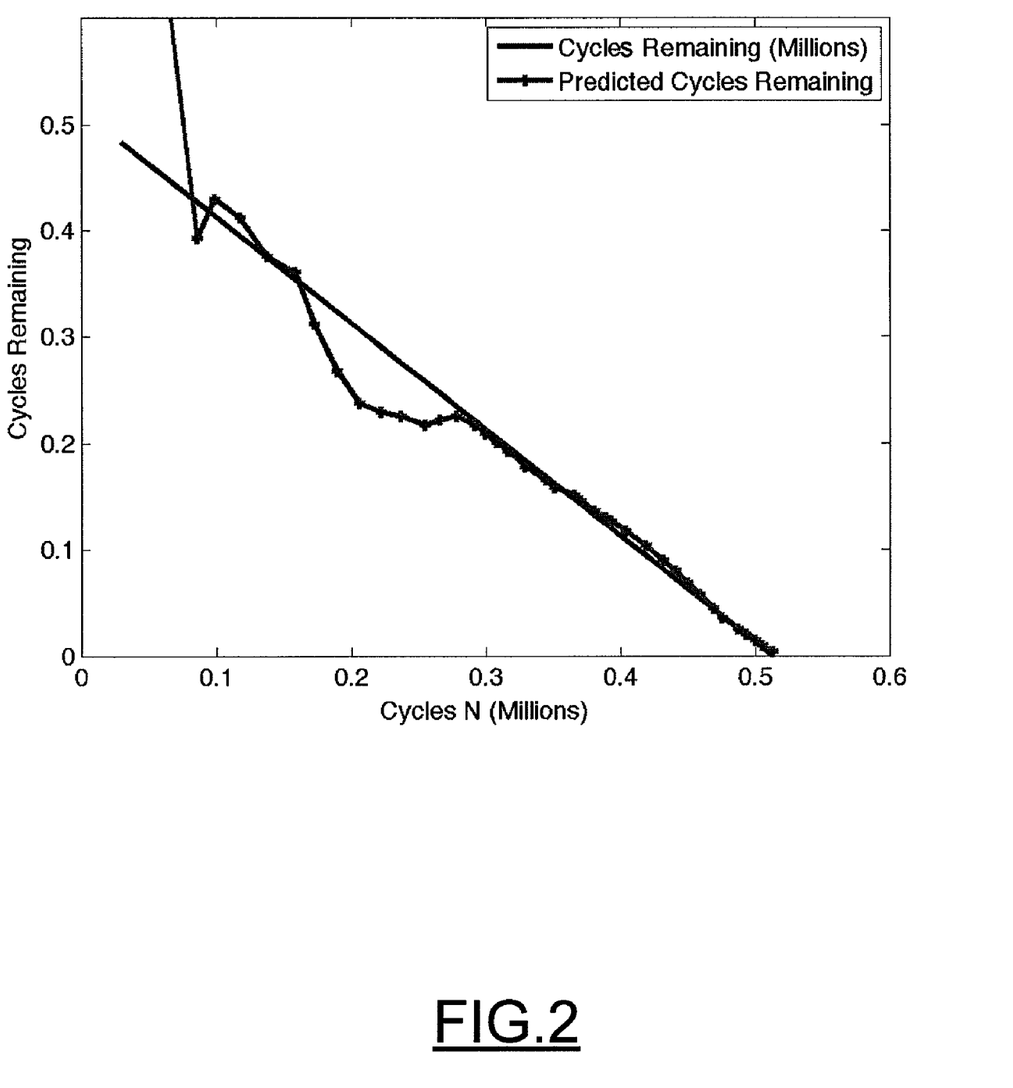
FIG. 2 is a graph of fatigue cycles using an exemplary embodiment of the present invention.

The process described above has been tested against actual data and the predictions with respect to determining the future time has been found to be quite accurate when used with respect to when maintenance can be desired. In one exemplary test, austenitic steel was utilized where the cyclic loading was 62 $MN/m^2$. FIG. 2 is a graph of the actual fatigue cycles based on the actual data, such as material type, material shape, force applied, etc., which is known in the testing environment. These actual results are graphed against the predicted fatigue cycles, which can be converted to future time, using exemplary embodiments of the present invention as discussed. The x-axis of the graph of FIG. 2 describes the number of cycles that have impacted the test component thus far, and the y-axis indicates the number of fatigue cycles. Here, fatigue cycles have been used as the output of the process since fatigue cycles are related to time via a constant conversion factor in a synchronous system. As one can see from the graph of FIG. 2 the number of fatigue cycles as calculated by exemplary embodiments of the present invention quickly converges to the actual value and thus proves to be a useful means of predicting the number of cycles, and thus the future time associated with a component.

Figure 3:
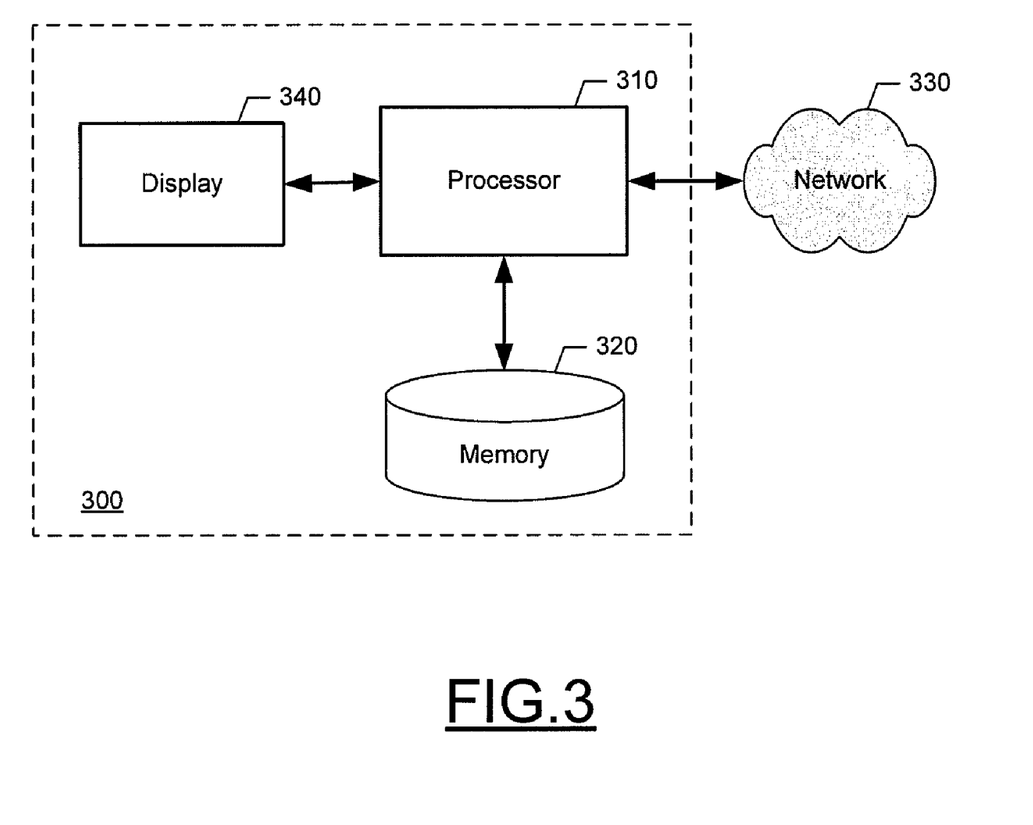
FIG. 3 is a schematic block diagram of a computing apparatus according to an exemplary embodiment of the present invention.

FIG. 3 illustrates a block diagram of a computing apparatus 300 that may benefit from embodiments of the present invention. It should be understood, however, that a computing apparatus 300 as illustrated and hereinafter described is merely illustrative of one type of computing apparatus that would benefit from embodiments of the present invention and, therefore, should not be taken to limit the scope of embodiments of the present invention.

In this regard, as indicated above, the method of exemplary embodiments of the present invention can be performed by a processor 310 of computing apparatus 300 by manipulating data stored in memory 320. Processor 310 may implement any one of a number of commercially available computer software programs to manipulate data stored in memory 320. The processor 310 can include means, such as circuitry, desirable for implementing computing functions of the computing apparatus 300.

Processor 310 may be capable of operating a connectivity program, such as a network interface program. The connectivity program may then allow the computing apparatus 300 to transmit and receive data relating to exemplary embodiments of the present invention via a network 330. As such, processor 310 can include an interface to network 330. Network 330 can be a local area network (LAN) and/or a wide area network (WAN) and network 330 can be connected to various other computing apparatuses and/or various other networks, such as, for example, the Internet.

Memory 320 can also be coupled to processor 310. Memory 320 can be volatile memory, such as Random Access Memory (RAM), and memory 320 can include a cache area for the temporary storage of data. Memory 320 may also include non-volatile memory, which can be embedded and/or may be removable. The non-volatile memory can additionally or alternatively comprise an electrically erasable programmable read only memory (EEPROM), flash memory or the like. The memory 320 can store any of a number of pieces of information, and data, used by the processing apparatus 300 to implement the functions of the processing apparatus 300.

The computing apparatus 300 may also comprise a user interface including an output device such as a display 340, and a user input interface (not shown), which are coupled to the processor 300. Display 340 can be used to present information relating to exemplary embodiments of the present invention.

According to one aspect of the present invention, computing apparatus 300 or processor 310, which implements exemplary embodiments of the present invention, generally operates under control of computer-readable program code portions which may be stored on a computer-readable storage medium to form a computer program product. The computer program product for performing the methods of exemplary embodiments of the present invention includes a computer-readable storage medium and computer-readable program code portions, such as a series of computer instructions, embodied in the computer-readable storage medium.

In this regard, FIG. 1 is a flowchart of methods, apparatuses and program products according to exemplary embodiments of the present invention. It will be understood that each block or step of the flowcharts, and combinations of blocks in the flowcharts, can be implemented by computer program instructions. These computer program instructions may be loaded onto a computer or other programmable apparatus, such as computing apparatus 300 or processor 310, to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the present invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
   determining, using at least one processor, a health indicator at a given time and a rate of change of the health indicator over a period of time for a component of a system including one or more components, the health indicator having been determined based on vibration data associated with the component; and
   determining, using at least one processor, a future time for the component as a function of the health indicator and a material constant, the material constant being determinable as a function of the rate of change of the health indicator, the component being subjectable to fatigue from the given time to the future time, wherein determining the future time includes determining a number of fatigue cycles.

2. The method of claim 1, wherein determining the health indicator and the rate of change of the health indicator includes conditioning the health indicator over the period of time using a Kalman filter.

3. The method of claim 2 further comprising determining the material constant, including conditioning a plurality of estimated material constants using an extended Kalman filter.

4. The method of claim 1, wherein determining the health indicator and the rate of change of the health indicator includes conditioning the health indicator over the period of time using Markov models.

5. The method of claim 1, wherein determining the future time comprises converting the number of fatigue cycles to the future time using a conversion factor.

6. The method of claim 1 further comprising generating a notification if the future time is less than a threshold value.

7. An apparatus comprising a processor, the processor configured to:
   determine a health indicator at a given time and a rate of change of the health indicator over a period of time for a component of a system including one or more components, the health indicator having been determined based on vibration data associated with the component; and determine a future time for the component as a function of the health indicator and a material constant, the material constant being determinable as a function of the rate of change of the health indicator, wherein the processor is further configured to determine the future time including being configured to determine a number of fatigue cycles.

8. The apparatus of claim 7, wherein the processor is further configured to determine the health indicator and the rate of change of the health indicator including being configured to condition the health indicator over the period of time using a Kalman filter.

9. The apparatus of claim 7, wherein the processor is further configured to determine the health indicator and the rate of change of the health indicator including being configured to condition the health indicator over the period of time using Markov models.

10. The apparatus of claim 7, wherein the processor is further configured to determine the material constant including being configured to condition a plurality of estimated material constants using an extended Kalman filter.

11. The apparatus of claim 7, wherein the processor is further configured to determine the future time including being configured to convert the number of fatigue cycles to the future time using a conversion factor.

12. The apparatus of claim 7, wherein the processor is further configured to generate a notification if the future time is less than a threshold value.

13. A computer-readable storage medium having computer-readable program code portions stored therein, the computer-readable program code portions comprising:
   a first executable portion configured to determine a health indicator at a given time and a rate of change of the health indicator over a period of time for a component of a system including one or more components, the health indicator having been determined based on vibration data associated with the component; and
   a second executable portion configured to determine a future time for the component as a function of the health indicator and a material constant, the material constant being determinable as a function of the rate of change of the health indicator, the component being subjectable to fatigue from the given time to the future time, wherein the second executable portion is further configured to determine a number of fatigue cycles.

14. The computer-readable storage medium of claim 13, wherein the first executable portion is further configured to determine the health indicator and the rate of change of the health indicator including conditioning the health indicator over the period of time using a Kalman filter.

15. The computer-readable storage medium of claim 14 further comprising a third executable portion configured to determine the material constant including conditioning a plurality of estimated material constants using an extended Kalman filter.

16. The computer-readable storage medium of claim 13, wherein the first executable portion is further configured to determine the health indicator and the rate of change of the health indicator including conditioning the health indicator over the period of time using Markov models.

17. The computer-readable storage medium of claim 13, wherein the second executable portion is further configured to convert the number of fatigue cycles to the future time using a conversion factor.

18. The computer-readable storage medium of claim 17 further comprising a third executable portion configured to generate a notification if the future time is less than a threshold value.

19. A computer-readable storage medium having computer-readable program code portions stored therein, the computer-readable program code portions comprising:
   a first executable portion configured to determine a health indicator at a given time and a rate of change of the health indicator over a period of time for a component of a system including one or more components, the health indicator having been determined based on vibration data acquired associated with the component; and
   a second executable portion configured to determine a future time for the component as a function of the health indicator and a material constant, the material constant being determinable as a function of the rate of change of the health indicator, the component being subjectable to fatigue from the given time to the future time, wherein the second executable portion is further configured to determine a number of fatigue cycles.

20. The computer-readable storage medium of claim 19, wherein the first executable portion is further configured to determine the health indicator and the rate of change of the health indicator including conditioning the health indicator over the period of time using a Kalman filter.

21. The computer-readable storage medium of claim 20 further comprising a third executable portion configured to determine the material constant including conditioning a plurality of estimated material constants using an extended Kalman filter.

* * * * *